United States Patent [19]

Marchello

[11] 4,451,083
[45] May 29, 1984

[54] BICYCLE SADDLE COVER PAD

[75] Inventor: John L. Marchello, Traverse City, Mich.

[73] Assignee: Danmar Products, Inc., Ann Arbor, Mich.

[21] Appl. No.: 371,061

[22] Filed: Apr. 23, 1982

[51] Int. Cl.³ .............................................. B62J 1/00
[52] U.S. Cl. ................... 297/195; 297/214; 297/219; 297/453
[58] Field of Search ............... 297/195, 199, 200, 214, 297/180, 219, 218, 453, 243

[56] References Cited

U.S. PATENT DOCUMENTS

| | | | |
|---|---|---|---|
| 1,467,878 | 9/1923 | Rimpler et al. | 297/195 X |
| 2,332,847 | 10/1943 | Franke | 297/195 |
| 3,331,089 | 7/1967 | Ornas, Jr. et al. | 297/453 X |
| 3,514,156 | 5/1970 | Fields | 297/195 X |

FOREIGN PATENT DOCUMENTS

| | | | |
|---|---|---|---|
| 796997 | 2/1936 | France | 297/195 |
| 58078 | 5/1953 | France | 297/219 |
| 457044 | 5/1950 | Italy | 297/219 |
| 5168 | of 1899 | United Kingdom | 297/214 |
| 583023 | 12/1977 | U.S.S.R. | 297/195 |

Primary Examiner—James T. McCall
Attorney, Agent, or Firm—Cullen, Sloman, Cantor, Grauer, Scott and Rutherford

[57] ABSTRACT

A cover pad, for fitting over a conventional bicycle saddle, is formed of relatively thick, substantially resilient, shock absorbant, closed cell, cellular plastic material, with a water impervious integral skin covering the exposed surfaces of the pad. Normally, the pad provides a comfortable, resilient support surface upon the saddle. The plastic material rapidly compresses under shock forces resulting from road jolts or impacts, and recovers its original shape somewhat more slowly to absorb and reduce the energy of the shock forces and, thereby, reduce shock transmission to the rider. Numerous openings extend through the pad and are internally shaped to form columns of air that are trapped within the openings during compression of the pad when the upper and lower ends of the openings are sealed respectively by tight surface contact with the rider and the adjacent saddle surface. Thus, the compressively collapsed air columns provide a spring-like effect for shock absorbing, with the openings otherwise providing a ventilation system through and around the pad.

1 Claim, 8 Drawing Figures

BICYCLE SADDLE COVER PAD

BACKGROUND OF INVENTION

Conventional bicycle saddles or seats, which are usually formed of leather or plastic, are relatively hard and uncomfortable to the typical bicycle rider, particularly during long rides or rides over bumpy roads. Since bicycles are mass produced items, the bicycle saddles or seats are generally made for average dimension riders. Thus, they do not fit well for most riders. Moreover, since modern bicycles typically use thin tires and do not ordinarily include springs or shock absorbers within the bicycle frame construction, road shocks are normally transmitted directly to the rider through the saddle.

Since the portion of the rider's anatomy which is in contact with the seat is relatively more tender than other portions of the body, riding a bicycle is uncomfortable for any length of time and, can be painful due to chafing or substantial road shocks. Consequently, attempts have been made in the past to provide softer padding upon the bicycle saddle or seat surfaces to reduce the discomfort and to better fit the rider. While such prior pads can be a substantial improvement over the otherwise hard and unyielding saddle, the pads themselves can be uncomfortable. Typically, such pads do not have any means for air circulation or ventilation but rather are formed of monolithic sheet material surfaces which are uncomfortable after long periods of use. Moreover, despite such padding, shocks are still transmitted from the seat to the rider because the pads must be relatively thin. Too thick a pad would generally provide an unstable seat for the rider and the relatively thin pads are virtually useless for absorbing road shocks or forces of road jolts or impacts.

Thus, the invention herein relates to an improved cover pad for fitting over and around a typical bicycle saddle or seat for more rider comfort and for shock absorbing.

SUMMARY OF INVENTION

The invention herein relates to a shock absorbing cover pad formed to snugly fit over and envelope a convention bicycle saddle or seat. The pad is made of a shock absorbant plastic material which inherently absorbs a considerable portion of the shock loads which might otherwise be transmitted from the conventional hard saddle to the rider. That is, the pad is formed of a closed cell, cellular type plastic material which is relatively resilient, but characterized by compressing rapidly under load and recovering somewhat more slowly so as to absorb, without undue rebound, the momentary road shock loads applied to the bicycle.

In addition, the invention contemplates forming a system of holes in the pad which ordinarily functions to provide a ventilation system through the pads for rider comfort, but secondarily, functions to form an air spring arrangement for resiliently absorbing and dissipating shock forces.

An object of this invention is to provide a relatively inexpensive cover pad which may be formed of a single molded piece of plastic to fit a particular type or style bicycle saddle. These pads may be molded to fit different styles of bicycle saddles. Because of the simple and low cost construction, and because the pads can be applied by simply pulling them upon the bicycle saddles, such pads can be easily used by all bicyclists. In addition, the pads can be quickly and easily removed for cleaning or replacement whenever necessary.

Another object of the invention is to form the cover pad with thicker areas to cover the major portions of the upper surface of the bicycle saddle for better shock absorption, with the thick areas having specially shaped holes which tend to trap air during compression of the pad under impact loads so that the holes containing the trapped air act like numerous air springs to momentarily absorb and dissipate loads. The remaining portions of the pad, that is, the portions covering the upper saddle surface around and near the edges and the sides of the saddles are covered with a much thinner portion of the pad for better resiliency and form fitting and also for maintaining rider comfort without too great an increase in the width of the saddle portions between the rider's legs.

These and other objects and advantages of this invention will become apparent upon reading the following description, of which the attached drawings form a part.

DETAILED DESCRIPTION

Figure 1:
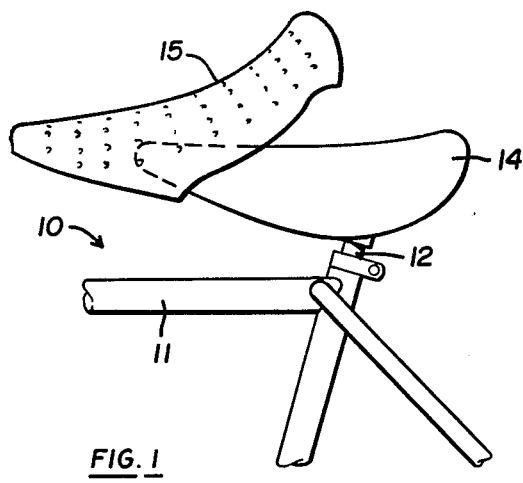
FIG. 1 schematically illustrates a bicycle saddle mounted upon a bicycle frame, with a cover pad being pulled upon the saddle.
Figure 2:
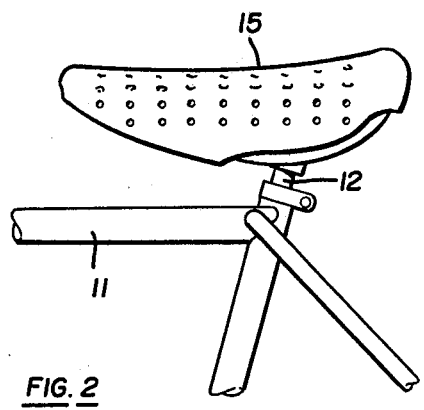
FIG. 2 shows the cover pads mounted upon a typical bicycle saddle.
Figure 3:
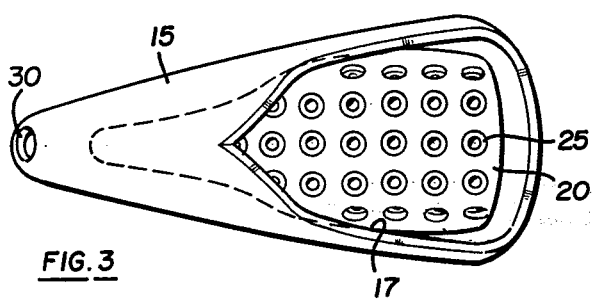
FIG. 3 is a bottom view of a cover pad, per se.

FIG. 1 schematically illustrates a portion of a conventional bicycle 10 which includes a conventional bicycle frame having a saddle support 12. A conventional saddle or bicycle seat 14 is mounted upon the bar in the usual manner. The seat illustrated is the long narrow style commonly called a racing style or light weight seat. However, the form or shape of the seat may vary and is immaterial to the invention herein.

The cover pad 15 is shaped like an elongated sleeve to snugly fit over and envelope the bicycle saddle. Thus, the upper surface 16 of the cover pad is generally of the same size and shape of the saddle. An opening 17 in the bottom of the cover pad is of the size and shape to receive the saddle. That is, as shown in FIG. 1, the saddle forward end is inserted into the opening 17 and the pad is pulled over the saddle until it resiliently embraces and covers the saddle.

Figure 4:
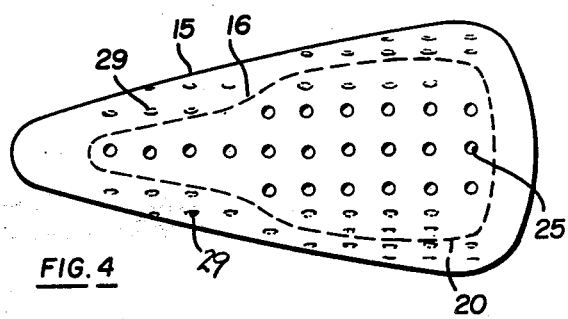
FIG. 4 is a top plan view of the cover pad.
Figure 5:
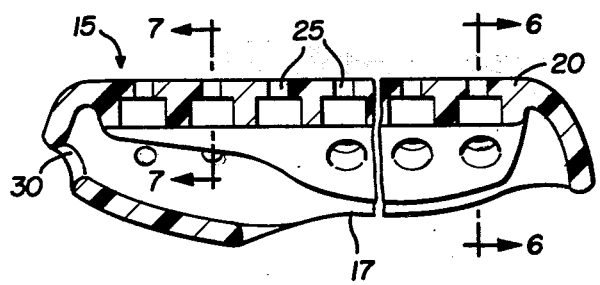
FIG. 5 is a cross-sectional view taken in the direction of 5—5 of FIG. 4.
Figure 6:
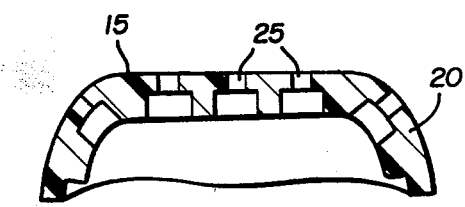
FIG. 6 is a cross-sectional view taken in the direction of 6—6 of FIG. 5.

The interior of the cover pad is provided with a thicker pad portion 20 which overlies the major portion of the saddle. The shape of the thicker pad portion may vary, depending upon the shape of the saddle upper surface. Thus, FIG. 4 shows the thicker pad portion in dotted lines as comprising a relatively elongated portion attached to a larger more round portion to generally simulate the upper surface of the particular style of saddle illustrated in the drawings.

Figure 7:
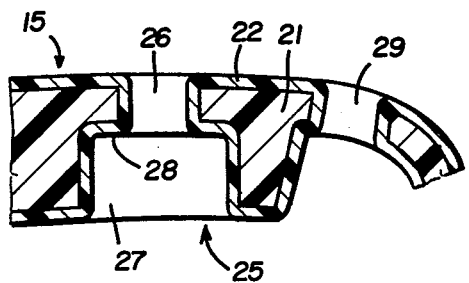
FIG. 7 is an enlarged, cross-section of, fragmentary view, showing the hole or opening arrangement in the pad.

The pad is formed of a shock absorbant material 21 (see FIG. 7). An operative example of such a material is that which is known by the trademark "ENSOLITE" manufactured by Uniroyal, Inc. This material is a closed cell, cellular plastic material made of polyvinyl chloride. The commercial forms of this material may vary in composition, resiliency and shock absorbancy. Thus, those skilled in the art would have to select the particular commercially availabe composition which best absorbs the anticipated shocks for a particular model or style bicycle. That is, the composition of the cellular material may vary without departing from the inventive concept herein, with the object of utilizng the least expensive cellular material which will perform the shock absorbing and other functions as described below.

The material should be relatively resilient so as to recover its shape upon compression. This contrasts with some types of closed cell materials which crush to absorb energy but then do not substantially rebound and consequently would have to be replaced after each shock. In the case of a bicycle pad, rebound or recovery of shape is essential because of the repeated application of impact forces to the seat and the necessity that it perform for long periods of time.

Polyvinyl chloride cellular material which may be modified with other plastic materials or nitrile rubber materials to strengthen the cell walls and wherein the closed cells may be filled with a gaseous material, such as nitrogen, is suitable for the purposes intended for the pad here. But, as mentioned above, such materials are made in various cell size, grades, absorption abilities, rebound abilities and resiliencies, etc. Thus, the particular commercially available material may vary considerably. Further, other types of closed cellular material, made of other plastics, may also be commercially available for the same purpose.

The cellular material which makes up the pad should be covered with an external water and air impervious skin formed integral with the exposed surfaces of the cellular material including covering the interior walls which define the holes or openings. Such skin prevents the seat from absorbing atmospheric moisture and rider perspiration, and also permits the pad to be easily cleaned or wiped. It also provides a more comfortable contact with the wearer's clothes. In addition, the integral skin protects the cellular material from breaking or tearing as it is otherwise prone to do since cellular plastics are typically relatively weak in tear or break resistance. The formation of such a skin and the thickness of it may vary, but conventional techniques are available to produce such a skin on the surface of such cellular materials.

Holes or openings 25 are formed through the thicker pad portion 20. Preferably, the holes 25 are made of upper, small diameter cylindrical portions 26 and larger, lower cylindrical portions 27 hich intersect within the pad to provide interior annular shoulders 28. This particular shape tends to form columns of air which are trapped within the holes when the smaller upper open ends of the holes are sealed by the rider's body and the larger open bottom ends of the holes are sealed against the saddle, which condition occurs during rapid compression of the pad due to impact forces transmitted through the saddle to the rider. The momentary sealing of the holes causes the air trapped within to act like air springs for absorbing the load by compression of the air columns. Upon release of the load, that is, upon rebound or restoration of the pad thickness, the momentary loosening of the seals of the opposite ends of the holes permits air escape. Also in normal operation, air circulates through the holes to a sufficient extent to ventilate the pad.

Additional holes 29 are provided through the thinner pad portions, that is, the portions that surround the thicker portion and overlie minor areas of the saddle upper surface. These holes 29 may be formed in the same manner as holes 25, or alternatively, may be approximately uniform in diameter as illustrated in FIG. 7. Their function is primarily ventilation, that is for the passage of air in and around the thicker portions of the pad for ventilation purposes.

The forward or narrow end of the pad is provided with an enlarged hole or opening 30 both for ventilation purposes as well as to enable the pad to better fit over and to stretch around the bicycle saddle. Since bicycle saddles, even of the same model, are not precision made and vary in dimensions considerably, the forward hole permits a better fit between the cover and the saddle.

Although the pad and hole dimensions may be widely varied, one example of useful dimensions comprises forming the thicker portion of the pad at approximately one-half inch thickness, and the thinner portion of the pad at approximately one-quarter inch thickness. Holes 29 may be approximately three-eighths inch diameter and holes 25 may be approximately three-eighths inch diameter and one-half inch diameter at their top and bottom portions respectively. These dimensions are variable depending upon the seat style and shape, the material used, and range of comfort selected, etc.

The cover pad may be frictionally held upon the saddle. That is, since it snugly fits upon the saddle and is somewhat stretched and resiliently positioned upon the saddle, that may be sufficient in most cases to keep the cover pad in place. However, since there are various models of saddles and in many cases, such saddles have such wide manufacturing tolerances, additional means may be desirable to better fasten the cover upon the saddle. One such means could be the application of a small amount of adhesive between the cover and the saddle or alternatively, the use of a double-faced adhesive tape for that purpose. Another simplified method for keeping the cover upon the saddle is the utilization of a draw string, such as a long shoe lace threaded through openings around the bottom edge of the opening of the cover pad.

Figure 8:
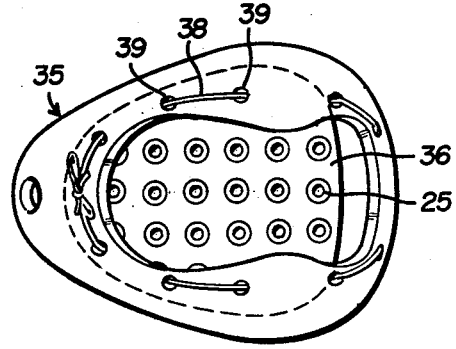
FIG. 8 is a bottom view of a modified form of cover pad which is shaped to fit a wider type bicycle saddle.

FIG. 8 illustrates a modified cover pad 35 which is shaped to fit over a larger or wider saddle or seat. The thicker pad portion 36, shown in dotted lines, is shaped to cover a substantial portion of the wider saddle. To keep this particular pad in place, which is more difficult because of its width and the larger size of the opening through which the saddle must be inserted, a drawstring 38 may be used. This drawstring is threaded through holes 39 and the opposite ends of the drawstring may be tied together.

Having fully described an operative embodiment to this invention, I now claim:

1. In a cover pad shaped for fitting uponand substantially enveloping a conventional bicycl saddle for padding the upper surface and sides of he saddle, the improvement comprising:
   said pa being shaped as an elongated sleeve with an upper surface and a bottom having an opening to receive sad saddle, and a forward end of the pad including a enlarged opening for ventilation;

said pad bein formed of a relatively thick, substantially resilient, closed cell, cellular type plastic material which rapidly compresses and less rapidly recovers its shape for thereby absorbing substantial portions of shock forces resulting from road jolts and impacts, which otherwise would be transmitted from the saddle directly to the rider, and with the pad normally providing a comfortable relatively resilient support surface upon the saddle;

numerous openings extend through the pad for normally providing air passages between the saddle and the rider for ventilation, but with such openings having their opposite open ends sealable respectively by tight surface contact with the rider's body and the adjacent saddle surfaces when the pad is momentarily compressed to trap air within the compressing openings to provide an air spring effect for absorbing shock forces;

said pad being cross-sectionally considerably thicker in its portions which overlay the major portions of the upper surfaces of the bicycle saddle, and with the openings that extend through the thicker portion of the pad being formed of two coaxial cylindrical shapes, with the shape adjacent the saddle being of larger diameter than the shape adjacent the rider's body, to form an internal annular shoulder within the wall defining the opening, for forming an air column of trapped air upon rapid compression of the pad, and including substantially uniform diameter openings extending through the pad in the thinner regions of the pad, which overlie minor portions of the saddle sides and upper surface.

* * * * *